United States Patent [19]

Tomida et al.

[11] Patent Number: 4,951,962
[45] Date of Patent: Aug. 28, 1990

[54] VIBRATION-PROOF STRUCTURE FOR AXLE BEAM OF MOTOR VEHICLE

[75] Inventors: Mamoru Tomida, Kasugai; Sadao Kondo, Hashima; Masato Ueno, Komaki; Takamasa Suzuki, Kounan; Masamitu Tukahara, Seki; Yosiyuki Asakawa, Okazaki, all of Japan

[73] Assignee: Toyoda Gosei Co., Ltd., Nishikasugai, Japan

[21] Appl. No.: 63,406

[22] Filed: Jun. 18, 1987

[30] Foreign Application Priority Data

Jul. 8, 1986 [JP] Japan .............................. 61-104646[U]
Jul. 15, 1986 [JP] Japan .............................. 61-108449[U]

[51] Int. Cl.$^5$ .............................................. F16L 13/14
[52] U.S. Cl. ..................................... 280/689; 301/127
[58] Field of Search ............... 301/125, 124 R, 124 H, 301/127, 131, 1; 180/85, 88, 75, 905, 906; 280/689, 723, 665

[56] References Cited

U.S. PATENT DOCUMENTS

| | | | |
|---|---|---|---|
| 3,218,053 | 11/1965 | Shreve | 280/689 X |
| 4,127,306 | 11/1978 | Foster | 301/127 |
| 4,532,741 | 8/1985 | Knudel | 296/201 X |
| 4,623,164 | 11/1986 | Cassel et al. | 280/689 |
| 4,750,757 | 6/1988 | Long | 280/689 |

FOREIGN PATENT DOCUMENTS 2804256 2/1979 Fed. Rep. of Germany ...... 280/723

OTHER PUBLICATIONS

Adjustment Manual of Toyota Starlet, Oct. 1984, pp. 6-1, 6-8, front page, contents page and date page.

Primary Examiner—Russell D. Stormer
Attorney, Agent, or Firm—Cushman, Darby & Cushman

[57] ABSTRACT

A vibration-proof structure for axle beam of a motor vehicle has an axle beam composed of a long cylindrical body of a letter U-shaped section opening downwards, which is disposed in the width direction of the motor vehicle. Axles are provided at both ends of the long cylindrical body, a stabilizer bar is disposed in the center of an interior of the long cylindrical body so as to connect the both ends of the long cylindrical body, and at least one vibration-proof rubber body is interposed between an inner wall of the axle beam and the stabilizer bar from the underside thereof in elastic contact therewith. The vibration-proof rubber body has an engaging member for engaging the vibration-proof rubber body with the axle beam or the stabilizer bar. The vibration-proof rubber body can be easily installed within the axle beam after the assembling of the axle beam and the stabilizer bar. The vibration-proof rubber body inserted between the axle beam and the stabilizer bar can be certainly engaged with the axle beam or the stabilizer bar by means of the engaging member. Accordingly, the vibration-proof rubber body is prevented from dropping due to vibration or the like.

11 Claims, 5 Drawing Sheets

VIBRATION-PROOF STRUCTURE FOR AXLE BEAM OF MOTOR VEHICLE

BACKGROUND OF THE INVENTION

1. Field of the Invention

The present invention relates to an axle beam used in a suspension for the rear wheels of a front-wheel drive motor vehicle, and more particularly to a vibration-proof structure for that axle beam.

2. Description of the Prior Art

One example of the above described axle beam is shown in FIG. 9. The axle beam 1 is composed of a long cylindrical body and is disposed in the width direction of a motor vehicle. Axles are provided at both ends of the axle beam 1 for supporting wheels. Suspension arms project from both end portions of the axle beam 1, and a tip end of each of the arms is turnably connected to a suspension member or the like under a vehicle body through an elastically damping mount(not shown). Shock absorbers and springs(not shown) are interposed between the axle beam 1 and the vehicle body.

The axle beam 1 has a downwards-opening letter U-shaped section as shown in FIG. 9. A stabilizer bar 4 composed of a torsion bar is disposed in the center of the opening portion of the axle beam 1 so as to longitudinally extend within the axle beam 1. Both ends of the stabilizer bar 4 are secured to both end surfaces of the axle beam 1.

In the axle beam having the above-described structure, the axle beam sometimes vibrates in the transverse direction to generate resonant sound therewithin at the vehicle braking time or the like. For preventing this resonant sound, conventionally, vibration-proof rubber bodies 5' are inserted within the axle beam 1 in elastic contact with both the stabilizer bar 4 and the axle beam 1.

The axle beam 1 and the stabilizer bar 4 must be subjected to rust-preventing coating. But, this rust-preventing coating cannot be adopted to the vibration-proof rubber bodies 5' since they are worsened due to this coating and the portions in contact with them cannot be coated.

Under the above circumstances, conventionally, the axle beam and stabilizer bar are previously subjected to the rust-preventing coating, respectively, and then, the vibration-proof rubber bodies are inserted when the axle beam and the stabilizer bar are assembled. However, this method requires time and labour in assembling.

SUMMARY OF THE INVENTION

It is an object of the present invention to provide a vibration-proof structure for axle beam of a motor vehicle, in which at least the vibration-proof rubber body can be easily inserted into the axle beam in the state where the stabilizer bar is assembled within the axle beam.

The vibration-proof structure for axle beam of a motor vehicle has an axle beam composed of a long cylindrical body of a letter U-shaped section opening downwards and disposed in the width direction of the motor vehicle. Axles are provided at both ends of the long cylindrical body, a stabilizer bar is disposed in the center of an interior of the long cylindrical body so as to connect the both ends of the long cylindrical body, and at least one vibration-proof rubber body is interposed between an inner wall of the axle beam and the stabilizer bar from the underside thereof, in elastic contact therewith. The vibration-proof rubber body has an engaging member for engaging the vibration-proof rubber body with one of the axle beam and the stabilizer bar.

In the vibration-proof structure for axle beam according to the present invention having the above-described structure, the vibration-proof rubber body can be easily installed within the axle beam after the assembling of the axle beam and the stabilizer bar. Accordingly, time and labour for assembling can be drastically decreased. And the vibration-proof rubber body inserted between the axle beam and the stabilizer bar can be certainly engaged with the axle beam or the stabilizer bar by means of the engaging member whereby the vibration-proof rubber body is prevented from dropping due to vibration or the like.

DETAILED DESCRIPTION OF THE EMBODIMENTS

Figure 1:
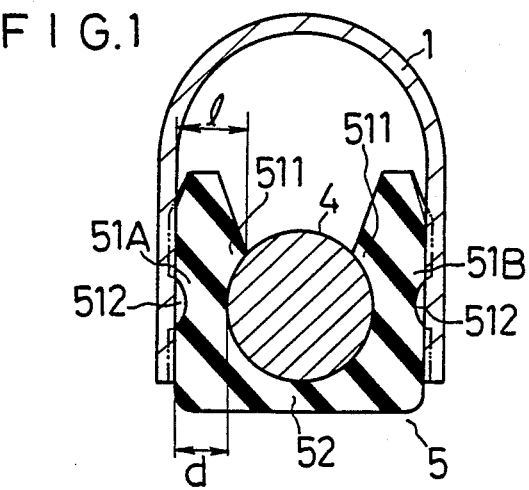
FIG. 1 is a sectional view of a first embodiment of the vibration-proof structure for an axle beam provided with vibration-proof rubber bodies according to the present invention, taken along the line of I—I of FIG. 2.

FIG. 1 shows a first embodiment of a vibration-proof structure for an axle beam according to the present invention.

Figure 2:
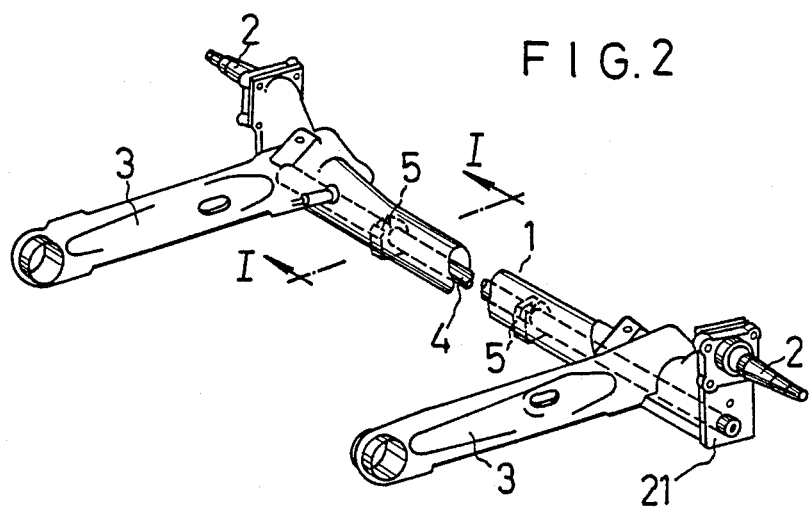
FIG. 2 is a perspective view of an overall vibration-proof structure for an axle beam.

The overall vibration-proof structure for an axle beam is shown in FIG. 2.

In FIG. 2, the cylindrical axle beam 1 disposed in the width direction of a motor vehicle, is provided with bracket plates 21 at both ends thereof. An axle 2 is secured to each of the bracket plates 21. A stabilizer bar 4 is disposed within the axle beam 1 in its longitudinal direction. Both ends of the stabilizer bar 4 are fixed to the bracket plates 21. A suspension arm 3 projects from each of both end portion of the axle beam 1 and is turnably connected to a suspension member or the like of a vehicle body.

A vibration-proof rubber body 5 is provided at each of two longitudinally spaced positions within the axle beam 1. The detail of each vibration-proof rubber 5 is shown in FIG. 1.

In FIG. 1, the axle beam 1 has a letter U-shaped section, opening downwards. The stabilizer bar 4 is positioned at the center of the interior of the axle beam 1, near its opening. The vibration-proof rubber body 5 is inserted in each of intervals between wall surfaces of the stabilizer bar 4 and the axle beam 1 from the underside thereof.

The vibration-proof rubber body 5 is composed of a rubber body of a predetermined thickness, which is formed into a letter U-shaped section. The inner surface of the vibration-proof rubber body 5 is curved along the outer periphery of the stabilizer bar 4. Leg portions 51A, 51B extend from a main portion 52, and have a tapered end portion of which the thickness is gradually decreased towards its tip end, respectively. An engaging portion 511 is formed just below the tapered end portion of each of leg portions 51A, 51B. The thickness(l) of the engaging portion 511 is larger than the minimum interval(d) between the stabilizer bar 4 and the axle beam 1.

Each of both leg portions 51A and 51B generally has a thickness slightly larger than the interval between the stabilizer bar 4 and the axle beam 1 as shown by a long and two short dashed lines. An arc-shaped groove 512 is formed in a nearly central portion of a side surface of each of the leg portions 51A and 51B, which is opposed to the inner side wall of the axle beam 1.

The vibration-proof rubber body 5 having the above-described structure can be easily installed in the state where the stabilizer bar 4 is assembled in the axle beam 1. Namely, when the tapered end portion of each of the leg portions 51A and 51B is inserted in each of intervals between the axle beam 1 and the stabilizer bar 4, the tapered end portion contracts during passing through the interval and then enlarges and returns to its original shape after passing through the interval so that each of the engaging portions 511 comes in contact with the upper half peripheral surface of the stabilizer bar 4. This results in each of the leg portions 51A and 51B of the vibration-proof rubber body 5 comming in elastic contact with the axle beam 1 and the stabilizer bar 4. The groove 512 provided in each of the leg portions 51A and 51B serves to enable the smooth insertion of the vibration-proof rubber body 5. It is preferable to coat the leg portions 51A and 51B with lamp oil or soapy water when being inserted.

It is preferable to use natural rubber having large elasticity, excellent durability and good flexibility as the material of the vibration-proof rubber body 5.

The above described vibration-proof rubber body 5 prevents the vibration of the axle beam 1 due to the curve thereof. And this vibration-proof rubber body 5 is certainly fit on the stabilizer bar 4 by virtue of the engaging portions 511 so as not to drop from the axle beam 1 due to the vibration thereof.

Figure 3:
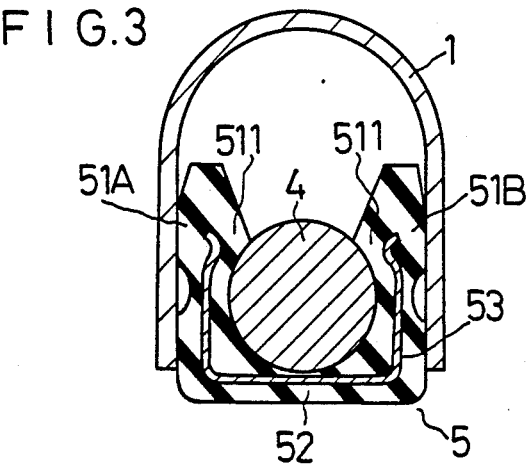
FIGS. 3 through 6 are sectional views of second through fifth embodiments of the vibration-proof structure for an axle beam provided with vibration-proof rubber bodies, respectively.

FIG. 3 shows a second embodiment of the vibration-proof structure for an axle beam according to the present invention.

In FIG. 3, an insert 53 formed of spring material into a letter U shape, is embedded in the vibration-proof rubber body 5. By virtue of the insert 53, the engaging portion 511 is made to come in contact with the upper half peripheral surface of the stabilizer 4 more certainly.

Figure 4:
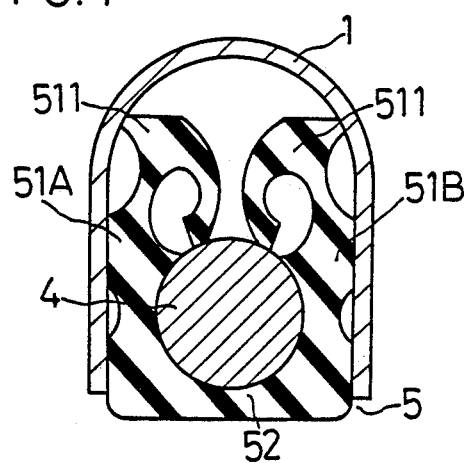

FIG. 4 illustrates a third embodiment of the vibration-proof structure for an axle beam, according to the present invention. In FIG. 4, a hook-shaped engaging portion 511 is formed in a tip end of each of the leg portions 51A and 51B of the vibration-proof rubber body 5. The hook-shaped engaging portion 511 returns to its original shape as shown in FIG. 4 after passing the interval between the axle beam 1 and the stabilizer bar 4 so that the tip end of each of the hook-shaped engaging portions 511 comes in elastic contact with the upper half peripheral surface of the stabilizer bar 4.

Figure 5:
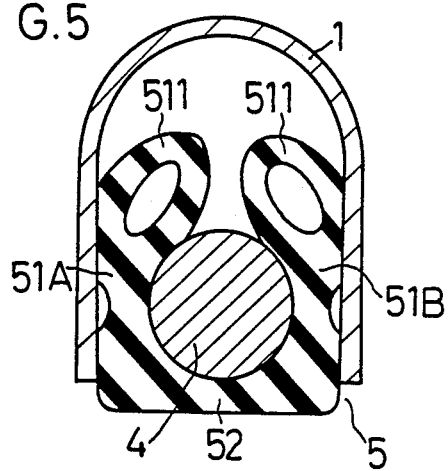

FIG. 5 illustrates a fourth embodiment of the vibration-proof structure for an axle beam, according to the present invention. In FIG. 5, a hollow elliptically cylindrical engaging portion 511 is formed in a tip end portion of each of the leg portions 51A and 51B of the vibration-proof rubber body 5. Each engaging portion 511 enlarges into its original shape after passing the interval between the axle beam and the stabilizer bar 4, as shown in FIG. 5, and comes in contact with the upper half peripheral surface of the stabilizer bar 4.

Figure 6:
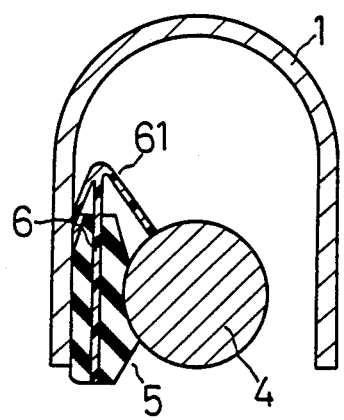

FIG. 6 illustrates a fifth embodiment of the vibration-proof structure for an axle beam, according to the present invention. In FIG. 6, each vibration-proof rubber body 5 is formed into a thick plate. The tip end portion is tapered and the surface opposed to the stabilizer bar 4 is curved along the outer periphery of the stabilizer bar 4. An umbrella shaped engaging member 6 formed of resin material such as nylon, is embedded in the vibration-proof rubber body 5 so that a tip end 61 projects from the tip end surface of the vibration-proof rubber body 5. The tip end 61 of the engaging member 6 returns to its original shape and opens after passing the interval between the axle beam 1 and the stabilizer bar 4. Then, an opened end comes in contact with the upper half peripheral surface of the stabilizer bar 4.

The preceding second through fifth embodiments of the present invention also exhibit the same operation effect as that of the first embodiment.

The vibration-proof rubber body 5 is not necessarily required to be formed into a letter U shape. As shown in the fifth embodiment, the vibration-proof rubber body 5 can be formed into a thick plate and disposed in only one of two intervals between the axle beam 1 and the stabilizer bar 4. However, there often occurs the case that the stabilizer bar 4 is not positioned at the center of the axle beam i due to an assembling error or the like. In this case, it is preferable to form each vibration-proof rubber body into a letter U shape so that one of the leg portions 51A and 51B certainly comes into contact with the stabilizer bar 4 for reducing the time and labour in assembling the vibration-proof rubber body 5.

Figure 7:
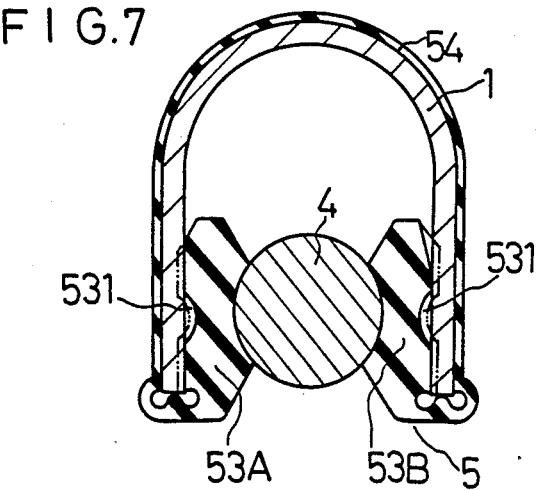
FIG. 7 is a sectional view of a sixth embodiment of vibration-proof structure for an axle beam provided with vibration-proof rubber bodies, taken along the line VII—VII of FIG. 8.

FIGS. 7 and B illustrate a sixth embodiment of a vibration-proof structure for an axle beam, according to the present invention.

Figure 8:
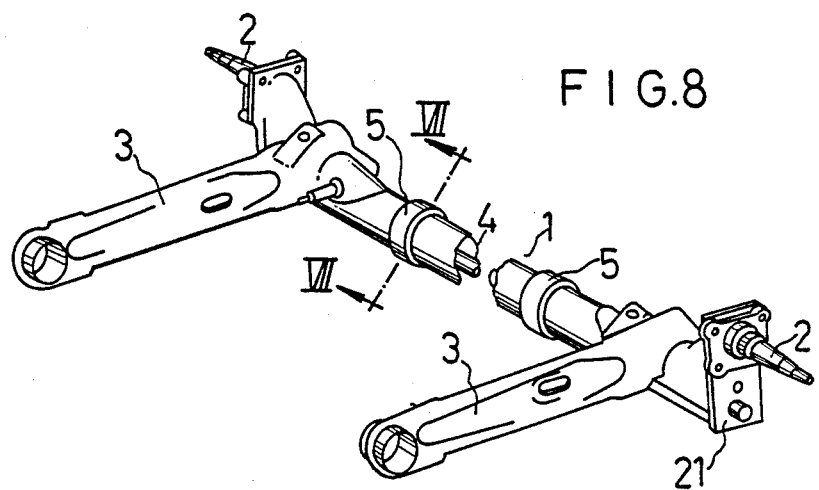
FIG. 8 is a perspective view of an overall vibration-proof structure for an axle beam according to the sixth embodiment.
Figure 9:
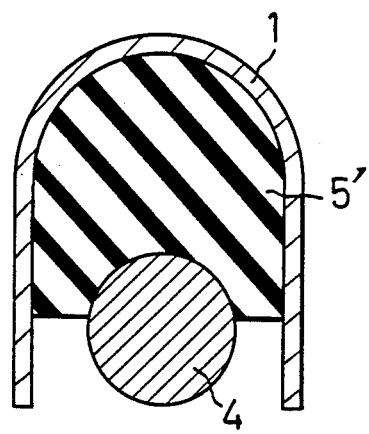
FIG. 9 is a sectional view of a conventional vibration-proof structure for an axle beam provided with vibration-proof rubber bodies.

In FIG. 8, vibration-proof rubber bodies 5 are provided at two longitudinally separated positions of the axle beam 1, so that one portion of each vibration-proof body 5 covers the axle beam 1. The other structure of the axle beam 1 and the structure of the bracket plate 21, the axle 2, the stabilizer 4 and the suspension arm 3 are substantially equal to those of the first embodiment shown in FIG. 2.

The vibration-proof structure for an axle beam according to the sixth embodiment is shown in FIG. 7 in detail.

Each of the vibration-proof rubber bodies 5 is composed of a pair of main body portions 53A and 53B, each being disposed between opposed side walls of the stabilizer bar 4 and the axle beam 1, and a thin walled connecting portion 54 which is disposed along the outer peripheral surface of the axle beam 1 and connects the main body portions 53A and 53B. Each of the main body portions 53A and 53B has the same width as each other and has a thickness larger than the interval between the side walls of the stabilizer bar 4 and the axle beam 1 as shown by alternate long and two short dashed lines in FIG. 1. The tip end portion of each of the main body portions 53A and 53B is tapered. The side surface of each of the main body portions 53A and 53B, which is opposed to the stabilizer bar 4 is formed into a concave surface abutting on the outer periphery of the stabilizer bar 4. The side surface of each of the main body portions 53A and 53B, which is opposed to the axle beam 1, is provided with an arc-shaped groove 531. This results in the thickness of the tip end portion of each of the main body portions 53A and 53B being larger than the middle portion thereof.

The vibration-proof rubber body 5 having the above-described structure can be easily installed in the state where the stabilizer bar is assembled in the axle beam 1. Namely, at first, one main body portion 53A is inserted in one of two intervals between the axle beam 1 and the stabilizer bar 4 to come into elastic contact therewith. Then, the connecting portion 54 is extended along the outer peripheral surface of the axle beam 1 and the other main body portion 53B is inserted into another interval between the axle beam 1 and the stabilizer bar 4 to come in elastic contact therewith.

It is preferable to coat the main body portions 53A and 53B with lamp oil and soapy water as a lubricant, when being inserted into the intervals between the axle beam 1 and the stabilizer bar 4. It is preferable to use soft natural rubber which has a large elasticity and excellent durability as the rubber material of the vibration-proof rubber body 5.

According to the sixth embodiment, the main body portions 63A and 53B can be smoothly inserted since the tip end of each of the main body portions 53A and 53B is tapered. And, after the main body portions 53A and 53B are inserted, the thick walled tip end portion comes into strong elastic contact with the axle beam 1 and the stabilizer bar 4 to prevent the curvature and vibration of the axle beam 1. The main body portions 53A and 53B are surely engaged with the axle beam 1 by virtue of the connecting portion 54 arranged along the outer surface of the axle beam 1. This results in the vibration-proof rubber body 5 being not dropped due to vibrations.

As described above, according to the sixth embodiment, the vibration-proof rubber body can be easily installed in the axle beam after the assembling and the coating thereof. Accordingly, the assembling process can be drastically reduced.

Furthermore, even when the stabilizer bar is not positioned at the center of the axle beam due to an error in the assembly thereof, at least one of a pair of right and left main body portions of the vibration-proof rubber body comes into elastic contact with the stabilizer bar and the axle beam with sufficient strength to restrain vibrations thereof.

As described above, according to the present invention, the vibration-proof rubber bodies can be easily installed within the axle beam after the assembly of the axle beam and the stabilizer bar to drastically reduce time and labour for assembling. And each vibration-proof rubber body inserted between the axle beam and the stabilizer bar can be certainly engaged with the stabilizer bar or the axle beam by virtue of its engaging portion whereby, each vibration-proof rubber body is prevented from dropping due to vibration or the like of the axle beam.

What is claimed is:
1. In combination with
a vehicle cross-beam axle member is
an inverted channel with a U-shaped cross-section defined by an upper half-round bight wall portion terminating in opposed side wall portions,
a circular sectioned torsion rod coextensive with said axle member having its principal axis positioned in a vertically disposed longitudinally extending plane of symmetry of said axle member within the confines of said channel, said channel wall portion and said torsion rod defining a generally D-shaped recess therebetween,
said rod principal axis positioned parallel to and a predetermined distance below the center of curvature of said axle upper bight wall portion,
wherein said D-shaped recess has a pair of predetermined minimal side gaps between said rod and its associated side wall portions, and an upper recess gap in said plane of symmetry having a predetermined dimension greater than said recess side gaps,
a resilient damper member of elastomer material adapted for insertion in said recess comprising:
a generally U-shaped damper member in its unassembled relaxed mode having a pair of upwardly extending leg portions interconnected by a base portion,
said leg and base portions defining a semi-circular upwardly opening bore having its central axis included in a vertically disposed longitudinally extending plane of symmetry with said bore sized for initially nestingly receiving said torsion rod therein,
said damper member in its relaxed mode having a planar base portion bottom surface and a pair of outwardly tapered leg portion side surfaces each oriented at a predetermined acute angle from the vertical,
each said leg distal end having an enlarged cone-section head element,
wherein upon said damper member upwardly opening semi-circular bore receiving said rod therein by virtue of each said leg portion head element inserted in said recess and compressed through an associated one of said side gaps, such that said damper member when compressively loaded within said recess having its cross-section transformed from a U-shape to a C-shape and
wherein each said leg portion head element located in said upper gap enabling said elements to partially expand to their normal unstressed state so as to lockingly fit in said recess upper gap with said bore substantially surrounding said torsion rod in a compression fit manner.
2. The combination as set forth in claim 1, wherein said damper member being initially coated with a heavy mineral oil fluid lubricant such that said damper member being readily inserted in said recess without distortion of said cross-beam axle, and
wherein upon said lubricant drying after installation of said damper member in said recess the residue of said lubricant providing a frictional bond between said damper member and said recess insuring the retention of said damper member therein.
3. A vibration-proof structure for an axle beam of a motor vehicle, comprising:
an axle beam comprising a long cylindrical body of U-shaped transverse cross-section, opening downwards and being disposed widthwise of a motor vehicle;

said axle beam being provided with axles at both ends of said long cylindrical body;

a stabilizer bar being disposed in the center of the interior of said long cylindrical body so as to connect both ends of said long cylindrical body;

at least one vibration-proof rubber body provided in at least one position of said long cylindrical body in its longitudinal direction and inserted between said long cylindrical body of said axle beam and said stabilizer bar from under said axle beam so as to be in elastic contact therewith, said vibration-proof rubber body having an inner surface and an outer surface conforming to respective opposed surfaces of said long cylindrical body and said stabilizer bar;

an engaging member made of an elastic material, which is provided at an upper end of said at least one vibration-proof rubber body; said engaging member having an original shape of a widthwise thickness larger than the minimum gap between said long cylindrical body and said axle beam, and after said vibration-proof rubber body is inserted between said axle beam and said stabilizer bar, from under said axle beam, said engaging member enlarging and returning to said original shape to come into contact with an upper half peripheral surface of said stabilizer bar thereby surely engaging said at least one vibration-proof rubber body with said stabilizer bar.

4. A vibration-proof structure according to claim 3, wherein:

said engaging member is an umbrella-shaped body made of a resin material, which is provided with a free end, said umbrella-shaped body returning to an original shape thereof after passing between said axle beam and said stabilizer bar, so that said free end opens and comes in contact with the upper half peripheral surface of said stabilizer bar.

5. A vibration-proof structure according to claim 3, wherein:

said at least one vibration-proof body comprises:

a pair of main body portions, each of which is inserted between said long cylindrical body of said axle beam and said stabilizer bar from under said axle beam and disposed in elastic contact with said axle beam and said stabilizer bar, and a connecting portion for connecting said pair of main body portions, said connecting portion being arranged along an outer surface of said axle beam to enable said pair of main body portions to be engaged with said axle beam.

6. A vibration-proof structure according to claim 3, wherein:

said axle beam and stabilizer bar but not said at least one-vibration-proof rubber body, having a coating of rust-preventing material provided thereon.

7. A vibration-proof structure for an axle beam of a motor vehicle, comprising:

an axle beam comprising a long cylindrical body of U-shaped transverse cross-section, opening downwards and being disposed widthwise of a motor vehicle;

said axle beam being provided with axles at both ends of said long cylindrical body;

a stabilizer bar being disposed in the center of the interior of said long cylindrical body so as to connect both ends of said long cylindrical body;

at least one vibration-proof rubber body provided in at least one position of said long cylindrical body in its longitudinal direction and inserted between said long cylindrical body of said axle beam and said stabilizer bar from under said axle beam so as to be in elastic contact therewith, said vibration-proof rubber body having an inner surface and an outer surface conforming to respective opposed surfaces of said long cylindrical body and said stabilizer bar;

said vibration-proof rubber body being provided with an engaging portion in its upper end; said engaging portion having an original shape of a widthwise thickness larger than the minimum gap between said long cylindrical body and said stabilizer bar, and after said vibration-proof rubber body is inserted between said axle beam and said stabilizer bar from under said axle beam, said engaging portion enlarging and returning to said original shape to come into contact with an upper half peripheral surface of said stabilizer bar thereby surely engaging said at least one vibration-proof rubber body with said stabilizer bar.

8. A vibration-proof structure according to claim 7, wherein:

said at least one vibration-proof rubber body has a U-shaped transverse cross-section, said at least one vibration-proof rubber body is provided with a plurality of leg portions projecting from both sides of an upper surface of a main body portion thereof, and said engaging portions is formed at an upper end of each of said leg portions.

9. A vibration-proof structure according to claim 8, further comprising:

an insert made of a spring material having a U-shaped transverse cross-section, said insert being embedded in said at least one vibration-proof rubber body along said stabilizer bar.

10. A vibration-proof structure according to claim 7, wherein:

said at least one vibration-proof rubber body comprises:

a pair of main body portions, each of which is inserted between said long cylindrical body of said axle beam and said stabilizer bar from under said axle beam and disposed in elastic contact with said axle beam and said stabilizer bar, and a connecting portion for connecting said pair of main body portions, said connecting portion being arranged along an outer surface of said axle beam to enable said pair of main body portions to be engaged with said axle beam.

11. A vibration-proof structure according to claim 7, wherein:

said axle beam and stabilizer bar but not said at least one vibration-proof rubber body, have a coating of rust-preventing material provided thereon.

* * * * *